(12) United States Patent
Moore et al.

(10) Patent No.: US 6,375,710 B2
(45) Date of Patent: Apr. 23, 2002

(54) PROCESS FOR PRODUCING POWDER METALLURGY COMPACTS FREE FROM BINDER CONTAMINATION AND COMPACTS PRODUCED THEREBY

(75) Inventors: Keith Lee Moore, Greenville; Brian John Melody, Greer; John Tony Kinard, Simpsonville; David Alexander Wheeler, Williamston, all of SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 0 days.

(21) Appl. No.: 09/740,973

(22) Filed: Dec. 21, 2000

Related U.S. Application Data

(62) Division of application No. 09/397,032, filed on Sep. 16, 1999, now Pat. No. 6,315,808.

(51) Int. Cl.[7] .................................................. B22F 9/00
(52) U.S. Cl. ......................................................... 75/252
(58) Field of Search ........................................... 75/255

(56) References Cited

U.S. PATENT DOCUMENTS 3,897,221 A * 7/1975 Salyer et al. .............. 29/191.2
5,159,007 A    10/1992 Saitoh et al.
5,470,525 A    11/1995 Tripp et al.
5,922,403 A     7/1999 Tecle

FOREIGN PATENT DOCUMENTS

| JP | 57 138050 | 8/1982 |
| JP | 58 108032 | 6/1983 |

OTHER PUBLICATIONS

PCT/US00/24912 International Search Report, dated Feb. 28, 2001.

* cited by examiner

*Primary Examiner*—Daniel J. Jenkins
(74) *Attorney, Agent, or Firm*—Banner & Witcoff, Ltd.

(57) ABSTRACT

Metal powders are pressed into compacts more readily through the addition of a minor percentage of dimethyl sulfone binder. Dimethyl sulfone may be dry-blended with the metal powder by mixing it in the form of a powder, or it may be wet-blended by first dissolving it in a suitable solvent, then adding it to the metal powder and evaporating the solvent. Dimethyl sulfone may be almost completely removed from compacts pressed from tantalum, etc., either by vacuum distillation or by water leaching, to leave compacts uncontaminated by the binder and suitable for further processing into capacitor anodes, etc.

4 Claims, No Drawings

PROCESS FOR PRODUCING POWDER METALLURGY COMPACTS FREE FROM BINDER CONTAMINATION AND COMPACTS PRODUCED THEREBY

This application is a divisional of Ser. No. 09/397,032, filed Sep. 16, 1999, now U.S. Pat. No. 6,315,808.

FIELD OF THE INVENTION

The invention relates to a method of producing powder metallurgy compacts free of binder contamination by pressing metal powder and a dimethyl sulfone binder.

BACKGROUND OF THE INVENTION

For many years powder metallurgy bodies fabricated from metals have found use in industry. Powder metallurgy compacts pressed from tantalum powder to approximately ¼ to ¾ of the theoretical density have been sintered to produce the tantalum capacitor anode bodies used to fabricate tantalum electrolytic capacitors. In order to facilitate the mass production of tantalum capacitor anodes, of which millions are fabricated daily, a binder or lubricant is usually mixed with the tantalum powder prior to the pressing step. This blending of tantalum powder and binder may be accomplished by one of two basic means: the binder may be employed in the form of a fine powder and mixed with the tantalum powder by dry-blending, physically shaking or tumbling the powders together, or the binder may be dissolved in a suitable solvent and the solution sprayed on, or tumbled with, the tantalum powder (called wet-blending), leaving-binder coated tantalum upon evaporation of the solvent.

After the tantalum powder/binder combination is pressed to form anode compacts, the binder has traditionally been removed via a vacuum distillation step at 200° C. to 600° C. prior to the high-temperature sintering step used to produce the finished capacitor anode bodies. The vacuum distillation binder removal step may also include the use of an inert "sweep" gas to assist in removing the binder from proximity to the anodes as it is volatilized.

The industry demand for ever smaller capacitors having increasing CV density and decreasing cost has led to the development of tantalum capacitor powders having an increasingly higher surface area per gram and smaller average particle size. In the 1960's, capacitor grade tantalum powder routinely had a surface area of 0.05 square meter per gram and a CV product of 5,000 microfarad-volts (or microcoulombs) per gram. By the 1980's, capacitor grade tantalum powders were available with a surface area of 0.2 square meter per gram and a CV product of 20,000 microcoulombs per gram. Currently available capacitor grade tantalum powders may have as high as 0.5 to 1.0 square meter per gram surface area and 50,000 to 100,000 microcoulombs per gram. The average particle size of capacitor grade tantalum powder in the 1960's was in excess of 5 microns. The average particle size of the finest contemporary tantalum powders is below 0.2 micron and sub-micron tantalum powders have been prepared.

The increase in surface area and reduction in the average particle size of capacitor grade tantalum powders has made possible both the size and cost reductions in tantalum capacitors sought by industry. Unfortunately, the reduction in the pore size of tantalum powder metallurgy anodes resulting from the use of these finer tantalum capacitor powders makes the removal of the binder/lubricant progressively more difficult with decreasing particle size. Further complicating the binder removal is the increasing surface energy and resulting reactivity of the tantalum powder as the particle size is reduced. Thus, anodes pressed from high surface area tantalum powders have very small pores through which the binder vapor must diffuse and are composed of particles that become very reactive at traditional binder removal temperatures due to the high surface energy associated with the small radii of curvature of these fine particles. The result is that an increasingly high fraction of the binder reacts with the tantalum anode material during the binder removal step and may be detected by the standard carbon analysis tests used for reactive metals.

Experience indicates that carbon residues formed by reaction between carbonaceous binders and the tantalum powder comprising tantalum anode compacts give rise to flaws in the anodic oxide film dielectric formed via various anodizing processes. Flaws in the anodic oxide give rise to elevated leakage current levels both in liquid electrolyte solutions (used to test the anodes and to fill "wet-slug" capacitors) and in finished "solid" tantalum capacitors.

In order to help reduce the residual carbon content of powder metallurgy capacitor anode bodies pressed from high surface area tantalum powder (and the elevated leakage current and short-circuit problems associated with this residual carbon), capacitor manufacturers have employed various approach to enhancing the binder removal process. Anodes may be processed in relatively small batches and spread out into relatively thin layers in order to minimize the diffusion path length which the binder vapor must transit to escape from the bulk of the anode bodies. As mentioned above, an inert "sweep" gas may be employed to help remove binder vapor from the vicinity of the anodes.

U.S. Pat. No. 4,664,883 describes a method of employing mixed binders in which one component exhibits relatively good binder properties, such as polyethylene oxide, and a second component which, while not having particularly good binder properties itself, decomposes at binder removal temperatures to yield a large quantity of gases which serve to help sweep the first binder component from the pores of the anode bodies. One disadvantage of this method is that the volatile binders described, ammonium carbonates, are hydroscopic and tend to absorb water during processing in humid environments, resulting in problems with powder flow.

Another relatively recently introduced binder material is polypropylene carbonate, which is sold by PAC Polymers under the name of "Q-PAC". This material thermally degrades in vacuum at approximately 250° C. to yield propylene carbonate, propylene oxide, and carbon dioxide. This material has been found to leave much less carbonaceous residue within vacuum sintered powder metallurgy capacitor anodes pressed from high surface area tantalum powder than is found with traditional binders, such as stearic acid, CARBOWAX 8000, or ACRAWAX C. Unfortunately, polypropylene carbonate is very difficult to mill for dry-blending use due to the glass transition temperature of approximately 40° C. (cryomilled powder tends to agglomerate into a solid mass unless stored and shipped under refrigeration). Due to the difficulties encountered in dry-blending polypropylene carbonate, the material is usually wet-blended with tantalum powder. The solubility of polypropylene carbonate is relatively high only in chlorinated solvents and acetone. The wet-blending of polypropylene carbonate on a manufacturing scale requires very thorough equipment design and careful plant operation to prevent ignition of or worker exposure to solvent fumes. Additionally, although polypropylene carbonate represents a definite improvement in ease of removal compared with traditional binder materials, such as stearic acid or ACRA-WAX C, it remains very difficult to remove the last traces of polypropylene carbonate from powder metallurgy tantalum anode compacts.

A simple and straightforward approach to removing binders/lubricants from tantalum powder metallurgy anode compacts is described in U.S. Pat. No. 5,470,525. The inventors employ binders which are fairly water soluble and remove the binder following the anode compacting step via warm water washing. This method avoids reaction of the carbonaceous binder with the tantalum at traditional binder removal temperatures by avoiding temperatures sufficiently hot to decompose the binder. With this methodology, virtually all of the binder may be removed with little or no damage to the product. One disadvantage with this process is that manufacturing plants already equipped for vacuum/thermal binder removal must purchase and install equipment for the water washing process and the binder must be soluble in water and have the necessary lubriciousness and ability to agglomerate fine tantalum powders into small tantalum-binder agglomerates having superior flow and reduced dust formation compared to the tantalum powder, alone.

Additionally, in a plant in which both processes, vacuum/thermal binder removal and water wash binder removal, are operated care must be taken that pressed tantalum anodes containing binder suitable for one removal process are not inadvertently subjected to the other process. For example, tantalum anode bodies containing wet-blended polypropylene carbonate, which is removed thermally, will contain grossly excessive amounts of carbon following processing through a water wash process designed to remove polyethylene glycol 8000, and capacitor anode bodies compacted from high surface area tantalum powder containing polyethylene glycol 8000 will be badly contaminated with carbon if subjected to a vacuum/thermal binder removal process.

Ammonium carbonate or bicarbonate may be used as the sole binder and may be completely removed from powder metallurgy capacitor anode bodies compacted from high surface area tantalum powder by either removal method. These materials have several disadvantages, however. Due to their high vapor pressure, they must be dry-blended. The ammonium carbonates are mechanically weak substances and offer little or no lubrication value. Tantalum powder blended with the ammonium carbonates as the sole binder is subject to a great deal of dust generation and gives rise to excessive wear of the anode compacting presses due to the settling of fine, abrasive tantalum dust on the sliding and rotating parts of the equipment. The ammonium carbonates also evaporate from open containers of tantalum capacitor powder blended with them. The resulting variable binder content due to evaporation complicates control of the weight of the anodes produced.

SUMMARY OF THE INVENTION

The invention is directed to a method of making powder metallurgy compacts with a dimethyl sulfone binder and the removal of the binder from the compacts.

The invention provides a method of making a powder metallurgy compact comprising the steps of: combining a metal powder and dimethyl sulfone in an amount to be effective as a binder; pressing the powder and dimethyl sulfone to form a powder metallurgy compact, such as an anode body; and removing the dimethyl sulfone.

The invention also provides a method of making powder metallurgy compacts wherein the dimethyl sulfone is removed by vacuum distillation or by washing with an aqueous solution.

Numerous other features, objects and advantages of the invention will become apparent from the following detailed description.

DETAILED DESCRIPTION OF THE INVENTION

It was discovered that dimethyl sulfone is an effective binder for making compacts with a metal powder. Such metal powders typically have a high surface area. The metal powder is pressed into compacts more readily by the addition of a minor amount of dimethyl sulfone binder.

The dimethyl sulfone is combined with the metal powder in any suitable manner. For example, a powder form of dimethyl sulfone may be dry-blended with the metal powder by mixing, or the dimethyl sulfone may be wet-blended by first dissolving the dimethyl sulfone a suitable solvent, then adding the solution to the fine reactive metal powder, and finally evaporating the solvent. Suitable solvents include, but are not limited to acetone and water.

The metal powder may be any suitable metal that is used to prepare compacts. Examples of metal powders include tantalum, niobium, titanium, zirconium, hafnium, nickel, copper, zinc, aluminides, bronze, etc. for the manufacture of capacitor anodes. Preferably the metal powder is tantalum powder.

The dimethyl sulfone is combined with metal powder in an amount effective as a binder, typically about 1 wt % to about 6 wt % based on total weight of binder and powder, preferably about 2 wt % to about 4 wt %.

The powder-binder combination is pressed to form a compact, for example, using conventional or traditional pressing technology.

The binder is then removed by any suitable method such as vacuum distillation or by washing the compact with water or other aqueous solution (leaching.) The dimethyl sulfone is almost or virtually completely removed from the compacts to leave compacts uncontaminated by the binder and/or resulting carbon residues and suitable for further processing into capacitor anodes, etc.

The vacuum distillation comprises heating the compact under a vacuum. The compact is heated to at least 200° C., preferably about 250° C. to about 350° C. for a time sufficient to remove the dimethyl sulfone, typically, but not limited to, about 0.5 to about 1.5 hours.

The water washing comprises rinsing the compact with water at least one time, more preferably at least two times, and most preferably about three times. The rinse preferably occurs at elevated temperatures of about 50° C. to about 95° C., preferably about 60° C. to about 90° C., most preferably about 80° C., for a time sufficient to remove the dimethyl sulfone.

The compacts are preferably used as anodes for electrolytic capacitors. Other uses include porous metal filters, gaseous diffusion media, and catalytic reaction surfaces.

Dimethyl sulfone is a non-hydroscopic, white solid having little or no odor, readily available and inexpensive. The material is somewhat lubricious and is mechanically strong enough to form tantalum powder/binder agglomerates for improved powder flow and greatly reduced dust formation. Dimethyl sulfone is very soluble in water at room temperature (up to approximately 40 wt. %) and is infinitely miscible with water at 80° C. Dimethyl sulfone melts at approximately 110° C. and boils at 238° C. to 240° C. at atmospheric pressure. The ash content is typically below 0.1%.

Literature from Gaylord Chemical, Bulletin No. 301 indicates that dimethyl sulfone is characterized by uncommon inertness, even at elevated temperatures. Heating dimethyl sulfone to a temperature of 275° C. for one hour results in autodecomposition of 0.3% mole %. It is reported to be stable at 238° C. in the presence of aqueous sodium hydroxide and at 130° C. in nitrating acid (fuming nitric and sulfuric acids). The extreme stability of the material allows for thermal/vacuum distillation removal from anode compacts pressed from high surface area reactive metals. The flash point of dimethyl sulfone is 290° F., 143° C., open cup.

In addition, dimethyl sulfone has a very low level of toxicity (the Gaylord Chemical Company's M.S.D.S. lists the Oral Rat LD50 as 17,000 mg/kg). It is considered to be a non-irritant to the skin and is readily biodegradable.

Dimethyl sulfone is compatible with tantalum and other reactive metal powders. It is available in the powdered state to facilitate dry-blending with tantalum powders. The vapor pressure is sufficiently low so that it does not evaporate from open containers of tantalum/binder blends nor does it evaporate during removal the solvent during a wet-blending operation.

Although not wishing to be bound by any theory, it is believed that the dimethyl sulfone binder can be removed completely via thermal/vacuum distillation since it is extremely stable with respect to autodecomposition and does not react with tantalum at temperatures required to vaporize the material under vacuum. It is also believed that the dimethyl sulfone binder can be also removed completely via water washing since it is highly and rapidly water soluble and solutions formed by the binder in hot water do not attack tantalum. Dimethyl sulfone has a relatively low molecular weight which appears to maximize diffusion during the removal process. Thus, once the capacitor compacts have been pressed, the dimethyl sulfone is capable of being removed either by vacuum/thermal distillation or by water wash methods. A mistake in the removal method used would have minimal negative consequences for a plant employing both removal methods.

EXAMPLES

Example 1

In order to illustrate the low level of residual carbon contamination which is obtainable with powder metallurgy compacts pressed from tantalum powder containing dimethyl sulfone as a binder, a quantity of Showa-Denko S705 tantalum powder was split into three groups. The groups were blended with 2 wt. % binder and were pressed into 0.26 gram tantalum anodes of the following dimensions: 0.125 inch thick by 0.128 inch wide by 0.185 inch long. The groups were then processed as indicated in Table 1.

It may readily be seen from the data in Table 1 that dimethyl sulfone may be completely removed from the anode compacts either by vacuum distillation or by water washing at 80° C. Values for carbon and oxygen were taken before sintering and after sintering at 1375° C. to 1385° C./15 min.

TABLE 1

| Group | Binder | Binder Removal | Carbon ppm | Oxygen ppm |
| --- | --- | --- | --- | --- |
| Virgin S705 | none | none | 24 | 3079 |
| 1 pre sintering | Dimethyl sulfone | Vacuum, 350° C. 1 ½ Hours | 26 | 3662 |
| 1 post sintering | Dimethyl sulfone | | 22 | 6485 |
| 2 pre sintering | Dimethyl sulfone | 1 Rinse* 2 Rinses* 3 Rinses* | 78 34 30 | 3733 3812 3787 |
| 2 post sintering | Dimethyl sulfone | | 20 | 6168 |
| 3 post sintering | Polypropylene carbonate | Vacuum, 350° C. 1 ½ Hours | 124 | 6667 |

*Each rinse consists of immersing the anodes in 80° C. deionized water for 1 hour; 2 liters of water per 1000 anodes.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A material for use in forming anodes for electrolytic capacitors, said material consisting of a metal powder and dimethyl sulfone.

2. A material for use in forming anodes for electrolytic capacitors, said material comprising a metal powder and dimethyl sulfone wherein the amount of dimethyl sulfone is between about 1 wt % and about 6 wt % based on total weight of dimethyl sulfone and powder.

3. The material of claim 2 wherein the amount of dimethyl sulfone is between about 2 wt % and about 4 wt % based on total weight of dimethyl sulfone and powder.

4. The material of claim 1 wherein the metal powder is tantalum.

* * * * *